(12) United States Patent
Takatsuka et al.

(10) Patent No.: US 11,010,824 B2
(45) Date of Patent: May 18, 2021

(54) BATTERY RESERVATION DEVICE AND BATTERY RESERVATION METHOD

(71) Applicant: OMRON CORPORATION, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON Corporation, Kyoto (JP)

(*) Notice: Subject to any disclaimer, the term of this patent is extended or adjusted under 35 U.S.C. 154(b) by 21 days.

(21) Appl. No.: 15/759,223

(22) PCT Filed: Nov. 2, 2016

(86) PCT No.: PCT/JP2016/082676
§ 371 (c)(1),
(2) Date: Mar. 11, 2018

(87) PCT Pub. No.: WO2017/086173
PCT Pub. Date: May 26, 2017

(65) Prior Publication Data
US 2018/0253789 A1    Sep. 6, 2018

(30) Foreign Application Priority Data

Nov. 17, 2015 (JP) .............................. JP2015-224345

(51) Int. Cl.
*G06Q 30/06* (2012.01)
*G06Q 50/06* (2012.01)
(Continued)

(52) U.S. Cl.
CPC .......... *G06Q 30/0645* (2013.01); *B60L 50/60* (2019.02); *B60L 53/665* (2019.02);
(Continued)

(58) Field of Classification Search
CPC ... Y02T 10/7005; Y02T 90/16; Y02T 90/124; Y02T 90/128; Y02T 90/163; Y02T 10/7088; Y02T 90/168
See application file for complete search history.

(56) References Cited

U.S. PATENT DOCUMENTS

RE30,939 E * 5/1982 d'Alayer de Costemore
d'Arc ..................... G11B 15/43
242/334.4
4,411,008 A * 10/1983 d'Alayer de Costemore
d'Arc ..................... G01B 7/042
360/137
(Continued)

FOREIGN PATENT DOCUMENTS

CN     1293149 A    5/2001
CN   103522994 A    1/2014
(Continued)

OTHER PUBLICATIONS

The extended European search report (EESR) dated Nov. 14, 2018 in a counterpart European patent application.
(Continued)

*Primary Examiner* — Darrin D Dunn
(74) *Attorney, Agent, or Firm* — METROLEX IP LAW GROUP, PLLC

(57) ABSTRACT

A battery reservation device (10) includes an input acceptance component (11), a battery number acquisition component (12), and a rental number and capacity calculator (15). The input acceptance component (11) inputs from the user information related to the total power amount of the battery packs (1) that is desired to be rented. The battery number acquisition component (12) acquires information related to the number of battery packs (1) that are installed in a vehicle (20). The rental number and capacity calculator (15) calculates the number and capacity of the battery packs (1) that
(Continued)

are rentable at each battery station (30) on the basis of information related to the number of battery packs (1) acquired by the battery number acquisition component (12) and the total power amount of the battery packs (1) inputted to the input acceptance component (11).

8 Claims, 10 Drawing Sheets

(51) Int. Cl.
  G06Q 10/02  (2012.01)
  H02J 7/00  (2006.01)
  G06Q 50/10  (2012.01)
  B60L 53/80  (2019.01)
  B60L 50/60  (2019.01)
  B60L 53/66  (2019.01)

(52) U.S. Cl.
  CPC .............. *B60L 53/80* (2019.02); *G06Q 10/02* (2013.01); *G06Q 50/06* (2013.01); *G06Q 50/10* (2013.01); *H02J 7/00* (2013.01); *G05B 2219/32328* (2013.01); *Y02T 90/12* (2013.01)

(56) References Cited

U.S. PATENT DOCUMENTS

| | | | | |
|---|---|---|---|---|
| 4,983,903 A * | 1/1991 | Bae | ............ | B60K 1/04 320/128 |
| 5,048,353 A * | 9/1991 | Justus | ............ | D21F 7/06 73/862.55 |
| 5,545,967 A * | 8/1996 | Osborne | ............ | B60S 5/06 320/109 |
| 5,563,809 A * | 10/1996 | Williams | ............ | G01N 9/24 700/122 |
| 5,612,606 A * | 3/1997 | Guimarin | ............ | B60K 1/04 320/109 |
| 5,623,194 A | 4/1997 | Boll et al. | | |
| 5,711,648 A * | 1/1998 | Hammerslag | ............ | B60K 1/04 414/800 |
| 6,036,137 A * | 3/2000 | Myren | ............ | B65H 18/10 242/534 |
| 6,325,321 B1 * | 12/2001 | Maurer | ............ | B65H 18/20 242/414.1 |
| 6,363,434 B1 | 3/2002 | Eytchison | | |
| 6,498,454 B1 * | 12/2002 | Pinlam | ............ | H01M 10/44 320/107 |
| 6,498,457 B1 * | 12/2002 | Tsuboi | ............ | B60L 50/64 320/110 |
| 7,002,265 B2 * | 2/2006 | Potega | ............ | G01R 31/36 307/149 |
| 7,412,538 B1 | 8/2008 | Eytchison et al. | | |
| 8,484,060 B2 | 7/2013 | D'Andrea et al. | | |
| 8,634,879 B2 * | 1/2014 | Shi | ............ | H04W 52/0248 455/572 |
| 8,698,642 B2 | 4/2014 | Taguchi | | |
| 8,751,077 B2 | 6/2014 | Hiruta et al. | | |
| 8,825,248 B2 | 9/2014 | Maki et al. | | |
| 8,838,318 B2 | 9/2014 | Segawa et al. | | |
| 8,862,391 B2 * | 10/2014 | Park | ............ | B60L 3/12 701/437 |
| 8,941,463 B2 * | 1/2015 | Rovik | ............ | B60L 3/12 340/5.2 |
| 8,963,495 B2 * | 2/2015 | Park | ............ | B60S 5/06 29/730 |
| 8,970,341 B2 * | 3/2015 | Park | ............ | B60L 3/12 340/4.3 |
| 9,123,035 B2 * | 9/2015 | Penilla | ............ | G06Q 20/18 |
| 9,129,272 B2 * | 9/2015 | Penilla | ............ | G06Q 20/18 |
| 9,156,360 B2 * | 10/2015 | Park | ............ | B60L 50/66 |
| 9,170,118 B2 * | 10/2015 | Kiyama | ............ | G01C 21/3469 |
| 9,172,254 B2 | 10/2015 | Ganor | | |
| 9,177,305 B2 * | 11/2015 | Penilla | ............ | G06Q 20/18 |
| 9,177,306 B2 * | 11/2015 | Penilla | ............ | G06Q 20/18 |
| 9,193,277 B1 * | 11/2015 | Penilla | ............ | G06Q 20/18 |
| 9,248,752 B2 | 2/2016 | Kuribayashi et al. | | |
| 9,302,592 B2 * | 4/2016 | Lin | ............ | B60L 53/305 |
| 9,321,357 B2 * | 4/2016 | Caldeira | ............ | B60L 11/1801 |
| 9,371,007 B1 | 6/2016 | Penilla et al. | | |
| 9,440,544 B2 * | 9/2016 | Lewis | ............ | B60L 11/1822 |
| 9,442,548 B1 * | 9/2016 | Johansson | ............ | G06F 1/3212 |
| 9,488,493 B2 | 11/2016 | MacNeille et al. | | |
| 9,496,736 B1 * | 11/2016 | Johansson | ............ | H02J 7/0054 |
| 9,597,973 B2 * | 3/2017 | Penilla | ............ | G06Q 20/18 |
| 9,623,762 B2 | 4/2017 | Park | | |
| 9,738,168 B2 * | 8/2017 | Penilla | ............ | G06Q 20/18 |
| 9,925,882 B2 * | 3/2018 | Penilla | ............ | G06Q 20/18 |
| 9,987,938 B2 * | 6/2018 | Salasoo | ............ | B60L 11/1822 |
| 10,084,329 B2 * | 9/2018 | Hamilton | ............ | H02J 7/0045 |
| 10,086,714 B2 * | 10/2018 | Penilla | ............ | G06Q 20/18 |
| 10,116,151 B2 * | 10/2018 | Seng | ............ | H02J 7/0042 |
| 10,209,090 B2 * | 2/2019 | Luke | ............ | B60L 1/003 |
| 10,245,964 B2 * | 4/2019 | Penilla | ............ | G06Q 20/18 |
| 10,286,801 B2 | 5/2019 | Shimizu et al. | | |
| 2003/0069868 A1 | 4/2003 | Vos | | |
| 2003/0074134 A1 | 4/2003 | Shike et al. | | |
| 2003/0085621 A1 * | 5/2003 | Potega | ............ | G01R 31/36 307/18 |
| 2004/0113591 A1 | 6/2004 | Bradley et al. | | |
| 2004/0158544 A1 | 8/2004 | Taekman et al. | | |
| 2005/0035740 A1 * | 2/2005 | Elder | ............ | B60L 3/0046 320/116 |
| 2005/0035741 A1 * | 2/2005 | Elder | ............ | B60L 3/0046 320/116 |
| 2006/0181427 A1 * | 8/2006 | Bouse | ............ | G05B 19/4065 340/657 |
| 2007/0043665 A1 | 2/2007 | Jemella et al. | | |
| 2007/0176040 A1 * | 8/2007 | Asikainen | ............ | B65H 26/02 242/534 |
| 2008/0157722 A1 | 7/2008 | Nobutaka et al. | | |
| 2008/0215180 A1 | 9/2008 | Kota | | |
| 2009/0082957 A1 | 3/2009 | Agassi et al. | | |
| 2009/0088889 A1 * | 4/2009 | Hellstrom | ............ | B65H 26/02 700/127 |
| 2009/0243549 A1 | 10/2009 | Matsumura et al. | | |
| 2009/0315359 A1 | 12/2009 | Suzuki et al. | | |
| 2010/0071979 A1 * | 3/2010 | Heichal | ............ | B60K 1/04 180/68.5 |
| 2010/0100573 A1 | 4/2010 | Harel et al. | | |
| 2010/0105449 A1 * | 4/2010 | Shi | ............ | H04W 52/0248 455/574 |
| 2010/0106401 A1 | 4/2010 | Naito et al. | | |
| 2010/0164439 A1 | 7/2010 | Ido | | |
| 2010/0230188 A1 * | 9/2010 | Nguyen | ............ | B60S 5/06 180/65.1 |
| 2011/0032110 A1 | 2/2011 | Taguchi | | |
| 2011/0128007 A1 | 6/2011 | Nishidai et al. | | |
| 2011/0156662 A1 | 6/2011 | Nakamura et al. | | |
| 2011/0225105 A1 * | 9/2011 | Scholer | ............ | G06Q 50/06 705/412 |
| 2011/0257901 A1 * | 10/2011 | Bechhoefer | ............ | G01H 1/00 702/34 |
| 2011/0303509 A1 * | 12/2011 | Agassi | ............ | B60K 1/04 198/604 |
| 2012/0054076 A1 | 3/2012 | Wu et al. | | |
| 2012/0098676 A1 | 4/2012 | Oizumi et al. | | |
| 2012/0109519 A1 | 5/2012 | Uyeki | | |
| 2012/0112696 A1 | 5/2012 | Ikeda et al. | | |
| 2012/0136594 A1 * | 5/2012 | Tang | ............ | H01M 10/425 702/63 |
| 2012/0229089 A1 | 9/2012 | Bemmel et al. | | |
| 2012/0242148 A1 * | 9/2012 | Galati | ............ | H02J 3/14 307/39 |
| 2012/0271723 A1 * | 10/2012 | Penilla | ............ | G06Q 20/18 705/16 |
| 2012/0306445 A1 * | 12/2012 | Park | ............ | B60S 5/06 320/109 |
| 2012/0326655 A1 | 12/2012 | Nomura | | |
| 2013/0013139 A1 | 1/2013 | Maki et al. | | |
| 2013/0030581 A1 * | 1/2013 | Luke | ............ | B60L 1/003 700/286 |

(56) References Cited

U.S. PATENT DOCUMENTS

| | | | |
|---|---|---|---|
| 2013/0030608 A1* | 1/2013 | Taylor | B60L 1/003 701/2 |
| 2013/0046457 A1 | 2/2013 | Pettersson | |
| 2013/0049677 A1* | 2/2013 | Bouman | B60L 1/003 320/106 |
| 2013/0119920 A1 | 5/2013 | Hsu et al. | |
| 2013/0151293 A1 | 6/2013 | Karner et al. | |
| 2013/0192060 A1* | 8/2013 | Park | B60L 3/12 29/729 |
| 2013/0197803 A1* | 8/2013 | Park | B60L 3/12 701/537 |
| 2013/0226441 A1* | 8/2013 | Horita | G01C 21/3469 701/118 |
| 2013/0261953 A1 | 10/2013 | Kiyama et al. | |
| 2013/0282472 A1* | 10/2013 | Penilla | B60L 53/305 705/14.35 |
| 2013/0317790 A1 | 11/2013 | Fukubayashi | |
| 2013/0335025 A1 | 12/2013 | Kuribayashi et al. | |
| 2013/0339072 A1 | 12/2013 | Touge | |
| 2013/0342310 A1* | 12/2013 | Park | B60L 3/12 340/5.7 |
| 2013/0343842 A1* | 12/2013 | Yu | B65G 1/137 414/273 |
| 2013/0345976 A1 | 12/2013 | Li et al. | |
| 2014/0046595 A1 | 2/2014 | Segawa et al. | |
| 2014/0100689 A1* | 4/2014 | Yu | B65G 1/137 700/218 |
| 2014/0116124 A1* | 5/2014 | Ma | G05B 23/0232 73/112.01 |
| 2014/0125281 A1 | 5/2014 | Mitsutani | |
| 2014/0148965 A1* | 5/2014 | Epstein | B60L 53/53 700/297 |
| 2014/0163877 A1 | 6/2014 | Kiyama et al. | |
| 2014/0172282 A1* | 6/2014 | Feng | B60L 58/12 701/117 |
| 2014/0232340 A1* | 8/2014 | Jones | G06Q 10/06 320/109 |
| 2014/0257884 A1* | 9/2014 | Kyoung | G06Q 10/02 705/5 |
| 2014/0266004 A1 | 9/2014 | Andrews, Jr. | |
| 2014/0371969 A1 | 12/2014 | Asai et al. | |
| 2015/0012212 A1* | 1/2015 | Park | B60L 3/12 701/431 |
| 2015/0024240 A1* | 1/2015 | Seubert | H02J 7/0065 429/50 |
| 2015/0039391 A1 | 2/2015 | Hershkovitz et al. | |
| 2015/0123611 A1* | 5/2015 | Huang | B60L 53/80 320/109 |
| 2015/0127479 A1* | 5/2015 | Penilla | G06Q 20/18 705/26.1 |
| 2015/0134142 A1* | 5/2015 | Taylor | G07C 5/00 701/1 |
| 2015/0134467 A1* | 5/2015 | Penilla | G06Q 20/18 705/16 |
| 2015/0134546 A1* | 5/2015 | Penilla | G06Q 20/18 705/305 |
| 2015/0149015 A1* | 5/2015 | Nakano | B60L 11/1861 701/22 |
| 2015/0158393 A1* | 6/2015 | Kawano | B60L 53/65 320/109 |
| 2015/0185721 A1 | 7/2015 | Deilmann et al. | |
| 2015/0202975 A1 | 7/2015 | Solomon et al. | |
| 2015/0241233 A1 | 8/2015 | Loftus et al. | |
| 2015/0256003 A1* | 9/2015 | Yonetani | B60L 53/68 320/150 |
| 2015/0280465 A1* | 10/2015 | Lin | H02J 7/007 320/137 |
| 2015/0283912 A1 | 10/2015 | Shimizu et al. | |
| 2015/0286965 A1* | 10/2015 | Amano | G01C 21/3469 705/5 |
| 2015/0298565 A1 | 10/2015 | Iwamura et al. | |
| 2015/0298567 A1 | 10/2015 | Uyeki | |
| 2015/0306967 A1* | 10/2015 | Cohen | B60L 11/1846 701/32.3 |
| 2015/0321570 A1 | 11/2015 | Cun | |
| 2015/0321571 A1* | 11/2015 | Penilla | G06Q 20/18 320/104 |
| 2015/0357837 A1* | 12/2015 | Takai | H01M 10/44 320/107 |
| 2015/0363749 A1* | 12/2015 | Buscher | G06Q 10/20 705/305 |
| 2015/0367743 A1* | 12/2015 | Lin | B60L 53/305 320/109 |
| 2015/0380936 A1 | 12/2015 | Frolik et al. | |
| 2016/0009192 A1 | 1/2016 | Zhang et al. | |
| 2016/0016481 A1 | 1/2016 | Maya et al. | |
| 2016/0025506 A1* | 1/2016 | Penilla | G06Q 20/18 701/430 |
| 2016/0039296 A1 | 2/2016 | Nakamura et al. | |
| 2016/0039299 A1 | 2/2016 | Nguyen | |
| 2016/0071079 A1* | 3/2016 | Aloe | H02J 7/0003 705/17 |
| 2016/0071138 A1 | 3/2016 | Hill | |
| 2016/0099590 A1* | 4/2016 | Velderman | H02J 7/0027 320/113 |
| 2016/0117759 A1* | 4/2016 | Penilla | B60L 53/305 705/26.9 |
| 2016/0159240 A1 | 6/2016 | Tseng et al. | |
| 2016/0176307 A1 | 6/2016 | Becker | |
| 2016/0185246 A1 | 6/2016 | Paul | |
| 2016/0272078 A1* | 9/2016 | Kalyanaraman | B60L 11/1822 |
| 2016/0273927 A1 | 9/2016 | Kitajima et al. | |
| 2016/0303990 A1* | 10/2016 | Penilla | G06Q 20/18 |
| 2016/0343068 A1 | 11/2016 | Barrois et al. | |
| 2016/0364776 A1 | 12/2016 | Khoo et al. | |
| 2016/0368464 A1* | 12/2016 | Hassounah | B60S 5/06 |
| 2016/0380440 A1 | 12/2016 | Coleman, Jr. et al. | |
| 2017/0036560 A1 | 2/2017 | Schuelke et al. | |
| 2017/0043671 A1* | 2/2017 | Campbell | G01C 21/34 |
| 2017/0074677 A1 | 3/2017 | MacNeille et al. | |
| 2017/0084155 A1 | 3/2017 | Mese et al. | |
| 2017/0085103 A1* | 3/2017 | Seng | H02J 7/0042 |
| 2017/0091890 A1 | 3/2017 | Hirose et al. | |
| 2017/0097652 A1* | 4/2017 | Luke | H02J 7/00 |
| 2017/0098176 A1 | 4/2017 | Hirose et al. | |
| 2017/0102695 A1* | 4/2017 | Hilemon | G05B 23/0264 |
| 2017/0136894 A1 | 5/2017 | Ricci | |
| 2017/0176195 A1 | 6/2017 | Rajagopalan et al. | |
| 2017/0190259 A1* | 7/2017 | Penilla | G06Q 20/18 |
| 2018/0012197 A1* | 1/2018 | Ricci | H04L 9/321 |
| 2018/0015835 A1* | 1/2018 | Penilla | G06Q 20/18 |
| 2018/0032920 A1* | 2/2018 | Ito | G06Q 10/04 |
| 2018/0041053 A1* | 2/2018 | Capizzo | H02J 7/0027 |
| 2018/0143029 A1 | 5/2018 | Nikulin et al. | |
| 2018/0154789 A1* | 6/2018 | Janku | B60S 5/06 |
| 2018/0202825 A1 | 7/2018 | You et al. | |
| 2018/0205257 A1 | 7/2018 | Kwon et al. | |
| 2018/0208069 A1* | 7/2018 | Lin | B60L 11/1822 |
| 2018/0241234 A1* | 8/2018 | Liang | H02J 7/0047 |
| 2018/0244167 A1* | 8/2018 | Penilla | G06Q 20/18 |
| 2018/0253788 A1* | 9/2018 | Takatsuka | B60L 58/12 |
| 2018/0253789 A1* | 9/2018 | Takatsuka | B60S 5/06 |
| 2018/0253928 A1* | 9/2018 | Assadsangabi | G06Q 20/18 |
| 2018/0272878 A1 | 9/2018 | Lee | |
| 2018/0312072 A1 | 11/2018 | Yang et al. | |
| 2019/0006862 A1* | 1/2019 | Hamilton, IV | H02J 7/0045 |
| 2019/0009683 A1 | 1/2019 | Saito et al. | |
| 2019/0011926 A1 | 1/2019 | Konishi et al. | |
| 2019/0031037 A1 | 1/2019 | Fendt | |
| 2019/0047434 A1 | 2/2019 | Oh et al. | |
| 2019/0061541 A1* | 2/2019 | Penilla | G06Q 20/18 |
| 2019/0156407 A1* | 5/2019 | Igata | G06Q 30/0284 |
| 2019/0157881 A1* | 5/2019 | Velderman | H02J 7/0027 |
| 2019/0197608 A1* | 6/2019 | Iwai | G01R 31/382 |

FOREIGN PATENT DOCUMENTS

| | | |
|---|---|---|
| CN | 104583719 A | 4/2015 |
| CN | 104779680 A | 7/2015 |
| EP | 2578997 A1 | 4/2013 |

(56) References Cited

FOREIGN PATENT DOCUMENTS

| | | |
|---|---|---|
| EP | 3090905 A1 | 11/2016 |
| JP | 2000-341868 A | 12/2000 |
| JP | 2003-262525 A | 9/2003 |
| JP | 2006-331405 A | 12/2006 |
| JP | 2007-116799 A | 5/2007 |
| JP | 2008009492 A | 1/2008 |
| JP | 2010-4666 A | 1/2010 |
| JP | 2010-107203 A | 5/2010 |
| JP | 2010-142026 A | 6/2010 |
| JP | 2010-230615 A | 10/2010 |
| JP | 2010-540907 A | 12/2010 |
| JP | 2011-83166 A | 4/2011 |
| JP | 2011-197932 A | 10/2011 |
| JP | 2011-253727 A | 12/2011 |
| JP | 2012-128633 A | 7/2012 |
| JP | 2012-145499 A | 8/2012 |
| JP | 2012-211903 A | 11/2012 |
| JP | 2013-15933 A | 1/2013 |
| JP | 2013-210281 A | 10/2013 |
| JP | 5362930 B1 | 12/2013 |
| JP | 2014-3803 A | 1/2014 |
| JP | 2014-524618 A | 9/2014 |
| JP | 2014-219749 A | 11/2014 |
| JP | 2014-225167 A | 12/2014 |
| JP | 2015-15875 A | 1/2015 |
| JP | 2015191425 A | 11/2015 |
| TW | 201321230 A1 | 6/2013 |
| TW | 201337805 A | 9/2013 |
| TW | I413015 B | 10/2013 |
| WO | 00/59230 A1 | 10/2000 |
| WO | 2013024484 A1 | 2/2013 |
| WO | 2013080211 A1 | 6/2013 |
| WO | 2015001930 A1 | 1/2015 |
| WO | 2017/086161 A1 | 5/2017 |
| WO | 2017/086172 A1 | 5/2017 |
| WO | 2017/086174 A1 | 5/2017 |

OTHER PUBLICATIONS

The Japanese Office Action dated Jun. 25, 2019 in a related Japanese patent application.

The extended European search report (EESR) dated Dec. 3, 2018 in a related European patent application.

The Taiwanese Office Action of a related Taiwanese application 105136976 dated Feb. 12, 2018.

An English translation of the International Search Report of a related international application PCT/JP2016/082565 dated Dec. 27, 2016.

An English translation of the Written Opinion of a related international application PCT/JP2016/082565 dated Dec. 27, 2016.

An English translation of the International Search Report of a related international application PCT/JP2016/082675 dated Jan. 10, 2017.

An English translation of the Written Opinion of a related international application PCT/JP2016/082675 dated Jan. 10, 2017.

An English translation of the International Search Report of PCT/JP2016/082676 dated Jan. 24, 2017.

An English translation of the International Search Report of a related international application PCT/JP2016/082677 dated Jan. 31, 2017.

An English translation of the Written Opinion of a related international application PCT/JP2016/082677 dated Jan. 31, 2017.

The Taiwanese Office Action of a related Taiwanese application 105136769 dated Jan. 22, 2018.

The extended European search report (EESR) dated Nov. 15, 2018 in a related European patent application.

The Taiwanese Office Action (TWOA) dated Feb. 21, 2018 in a related Taiwanese patent application.

The U.S. Office Action dated May 16, 2019 in a related U.S. Appl. No. 15/759,226.

The U.S. Office Action dated Aug. 21, 2019 in a related U.S. Appl. No. 15/759,220.

The U.S. Office Action dated Aug. 7, 2019 in a related U.S. Appl. No. 15/759,221.

The U.S. Office Action dated Nov. 29, 2019 in a related U.S. Appl. No. 15/759,221.

The U.S. Office Action dated Nov. 15, 2019 in a related U.S. Appl. No. 15/759,226.

The Office Action dated Jun. 2, 2020 in a counterpart Japanese patent application.

\* cited by examiner

| Number of exchanges | Capacity per battery pack | Priority order | Station reservation possible? |
|---|---|---|---|
| 1 | 2000wh | - | no |
| 2 | 1000wh | first | no |
| 3 | 666.7wh | second | yes |
| 4 | 500wh | third | yes |

FIG. 4

| Battery ID | Remaining capacity | Reservation status |
|---|---|---|
| 10001 | 500wh | unreserved |
| 10003 | 900wh | 11:00- |
| 10004 | 666.7wh | unreserved |
| 10005 | 500wh | unreserved |
| 10008 | 666.7wh | unreserved |
| 10012 | 666.7wh | unreserved |
| 10013 | 500wh | unreserved |
| 10014 | 800wh | unreserved |
| 10015 | 500wh | unreserved |
| 10016 | 200wh | unreserved |

FIG. 5

BATTERY RESERVATION DEVICE AND BATTERY RESERVATION METHOD

FIELD

The present invention relates to a battery reservation device and a battery reservation method for reserving the rental of batteries at battery stations, for power consumption elements in which a plurality of battery packs are installed.

BACKGROUND

Recent years have seen systems constructed in which battery packs installed in a vehicle such as an electric motorcycle or an electric bicycle are used and then exchanged at a battery station where charged batteries are available.

When battery packs are thus rented out, a system is sometimes used for reserving a battery pack rental at a battery station.

For example, Patent Literature 1 discloses a rechargeable battery management device for a portable medical device, in which it is determined whether or not a doctor can make his rounds using an electric vehicle, on the basis of the amount of power required to use the medical device, the amount of power required to travel to the destination, the current remaining battery charge, and so forth.

CITATION LIST

Patent Literature

Patent Literature 1: JP-A 2011-253727

SUMMARY

However, the following problems are encountered with the above-mentioned conventional rechargeable battery management device.

With the rechargeable battery management device disclosed in the above-mentioned publication, a problem is that what the user has to do to make a reservation tends to be complicated when reserving the rental of a battery pack at a battery station.

More specifically, the user has to input the number of battery packs to be reserved for rental at the battery station, the amount of power of each individual battery pack, and the like, so it the input of the necessary reservation information is not very intuitive.

It is an object of the present invention to provide a battery reservation device and a battery reservation method capable of simplifying the operation when reserving the rental of battery packs for a power consumption element in which a plurality of battery packs are installed.

The battery reservation device pertaining to the first invention is a battery reservation device that makes reservations at battery stations for the rental of a plurality of battery packs installed in a power consumption element, said device comprising an input acceptance component, a battery number acquisition component, and a rental number and capacity calculator. The input acceptance component inputs information related to the total amount of power desired to be rented, from the user of the power consumption element. The battery number acquisition component acquires information related to the number of battery packs that are installed in the power consumption element. The rental number and capacity calculator calculates the number and capacity of the battery packs that are rentable at each battery station on the basis of information related to the number of battery packs acquired by the battery number acquisition component and the total power amount desired to be rented as inputted to the input acceptance component.

Here, when reserving the rental of a plurality of battery packs to be installed in a power consumption element at a battery station, once the user inputs information related to the total power amount desired to be rented, the number and capacity of battery packs that can be rented at each battery station are calculated on the basis of the number of battery packs that can be installed in the power consumption element.

The information related to the total power amount inputted by the user includes, for example, information such as the numerical value of the total power amount, the scheduled travel distance after rental, and input by qualitative expression of the total power amount, such as large, medium and small.

Also, the power consumption element includes, for example, vehicles such as electric motorcycles, electric bicycles, electrically assisted bicycles, electric unicycles, electric automobiles (EVs), and PHVs (plug-in hybrid vehicles), as well as various other kinds of electrical product that are driven by exchangeable batteries.

Furthermore, the information related to the number of battery packs that can be installed in the power consumption element may be acquired directly, or indirectly by using a number or the like that is unique to the power consumption element.

Consequently, the user who makes a reservation to rent a battery pack simply inputs information related to the total amount of power he wants to rent, and is then presented with the number and capacity of battery packs that can be rented at each battery station.

As a result, it is unnecessary to confirm and input the remaining battery charge and so forth for each the battery packs installed in the power consumption element, so the operation when reserving battery packs for rental can be simplified.

The battery reservation device pertaining to the second invention is the battery reservation device pertaining to the first invention, wherein the information related to the total power amount inputted to the input acceptance component includes one of the following: the rental duration, the payment amount, the scheduled travel distance, the amount of power desired to be rented, and the amount of power scheduled to be consumed.

Here, the information related to the total power amount that needs to be entered when renting a plurality of battery packs to be installed in a power consumption element is at least one of the following: the rental duration, the payment amount, the scheduled travel distance, the amount of power desired to be rented, and the amount of power scheduled to be consumed.

Here, when the rental duration is inputted, the amount of power that needs to be rented may be calculated on the basis of the current clock time and the rental duration. The amount of power needed may be calculated by using a table or the like in which the rental duration and the required power amount are associated with each other. Also, if the power consumption element is a vehicle, the amount of power scheduled to be consumed also includes the amount of power corresponding to the scheduled travel distance after battery pack rental, the numerical value for the scheduled travel distance, and so forth.

Consequently, when reserving a battery pack rental, the user can employ a simpler input operation to make a reservation at a battery station where the battery pack can be rented.

The battery reservation device pertaining to the third invention is the battery reservation device pertaining to the second invention, wherein the input acceptance component accepts input information selected by the user from among a plurality of options set in stages.

Here, the plurality of options set in stages can be, for example, a stepwise display of amounts such as large, medium, and small, as the total power amount that needs to be rented.

This makes it easy for the user to make a reservation at a battery station, merely by intuitively choosing options for the total power amount that needs to be rented.

The battery reservation device pertaining to the fourth invention is the battery reservation device pertaining to any of the first to third inventions, wherein information related to the desired pickup time of the battery packs at the battery station is further inputted to the input acceptance component.

Here, the desired pickup time for the battery packs is inputted as other information that is inputted when reserving the rental of a plurality of battery packs to be installed in a power consumption element.

Consequently, the user can reserve the rental of battery packs by selecting a battery station that can rent out battery packs of the desired capacity at the desired time period (desired pickup time).

The battery reservation device pertaining to the fifth invention is the battery reservation device pertaining to any of the first to fourth inventions, further comprising a battery station selector that presents the battery stations that rent out battery packs, on the basis of the number and capacity of the rentable battery packs calculated by the rental number and capacity calculator.

Here, battery stations satisfying the number and capacity of rentable battery packs calculated by the above-mentioned rental number and capacity calculator are presented to the user in a selectable format.

This allows the user to easily select a battery station that can provide the number and capacity of battery packs satisfying the necessary conditions, simply by inputting information related to the total power amount that the user wants to rent.

The battery reservation device pertaining to the sixth invention is the battery reservation device pertaining to any of the first to fifth inventions, wherein, in presenting a plurality of options, the battery station selector sets a priority order for the battery stations that are reservation candidates, on the basis of at least one of the following: the distance from the current location to the battery station, the number of rentals, the rental fee, and the waiting time at the battery station.

Here, a priority order is set for the battery stations that are presented as reservation candidates by the battery station selector, using the distance from the current location to the battery station, the number of rentals, the rental fee, the waiting time at the battery station, and other such information.

Consequently, the user can make a reservation by selecting the desired battery station from among the plurality of battery stations presented as reservation destination candidates, which are presented in order of closeness from the current position, in order of the fewest number of rentals, in order of the lowest rental fee, and in order of the shortest waiting time, for example.

The battery reservation device pertaining to the seventh invention is the battery reservation device pertaining to any of the first to sixth inventions, further comprising a charge and discharge plan production component that produces a charge and discharge plan for the battery packs on the basis of the number and capacity of the rentable battery packs calculated by the rental number and capacity calculator.

Here, the charge and discharge plan production section produces a charge and discharge plan for a plurality of battery packs managed at the reserved battery station.

Consequently, battery packs of the required number and capacity can be readied by the desired pickup time on the basis of reservation information, and the charging and discharging of the battery packs at the battery station can be controlled so that other reservations can be accepted.

The battery reservation device pertaining to the eighth invention is the battery reservation device pertaining to any of the first to seventh inventions, wherein the power consumption element is a vehicle, including an electric motorcycle, an electric bicycle, an electrically assisted bicycle, an electric automobile, or a PHV (plug-in hybrid vehicle).

Here, a vehicle such as an electric motorcycle or an electric bicycle is used as a specific power consumption element.

Consequently, the battery packs a user wants to rent can be reserved by a simple operation for a vehicle in which battery packs whose remaining battery charge is low are exchanged for charged battery packs at a specific battery station or the like, for example.

The battery reservation method pertaining to the ninth invention is a battery reservation method for reserving rentals at battery stations for a plurality of battery packs installed in a power consumption element, said method comprising an input acceptance step, a battery number acquisition step, and a rental number and capacity calculation step. The input acceptance step involves inputting information related to the total amount of power desired to be rented, from the user of the power consumption element. The battery number acquisition step involves acquiring information related to the number of battery packs that are installed in the power consumption element. The rental number and capacity calculation step involves calculating the number and capacity of the battery packs that are rented at each battery station on the basis of information related to the number of battery packs acquired in the battery number acquisition step and the total power amount desired to be rented as inputted in the input acceptance step.

Here, when reserving a plurality of battery packs to be installed in a power consumption element at a battery station, once the user inputs information related to the total power amount desired to be rented, the number and capacity of battery packs that can be rented at each battery station are calculated on the basis of the number of battery packs that can be installed in the power consumption element.

Here, the information related to the total power amount inputted by the user includes, for example, information such as the numerical value of the total power amount, the scheduled travel distance after rental, and input by qualitative expression of the total power amount, such as large, medium and small.

Also, the power consumption element includes, for example, vehicles such as electric motorcycles, electric bicycles, electrically assisted bicycles, electric unicycles, electric automobiles (EVs), and PHVs (plug-in hybrid vehicles), as well as various other kinds of electrical product that are driven by exchangeable batteries.

Furthermore, the information related to the number of battery packs that can be installed in the power consumption element may be acquired directly, or indirectly by using a number or the like that is unique to the power consumption element.

Consequently, the user who makes a reservation to rent a battery pack simply inputs information related to the total amount of power he wants to rent, and is then presented with the number and capacity of battery packs that can be rented at each battery station.

As a result, it is unnecessary to confirm and input the remaining battery charge and so forth for each the battery packs installed in the power consumption element, so the operation when reserving battery packs for rental can be simplified.

Effects

With the battery reservation device pertaining to the present invention, it is possible to simplify the operation when reserving the rental of battery packs for a power consumption element in which a plurality of battery packs are installed.

BRIEF DESCRIPTION OF THE DRAWINGS

FIG. 4 is a table showing the number of exchanges, the capacity per battery pack, the priority order, and whether or not reservation is possible, as a combination of battery packs that satisfy the total power amount desired to be rented that was inputted on the input screen in FIG. 3;

FIG. 5 is a table showing the remaining battery charge of each battery pack and whether or not it is reserved;

DETAILED DESCRIPTION

The battery reservation device pertaining to an embodiment of the present invention will now be described through reference to FIGS. 1 to 8.

Figure 1:
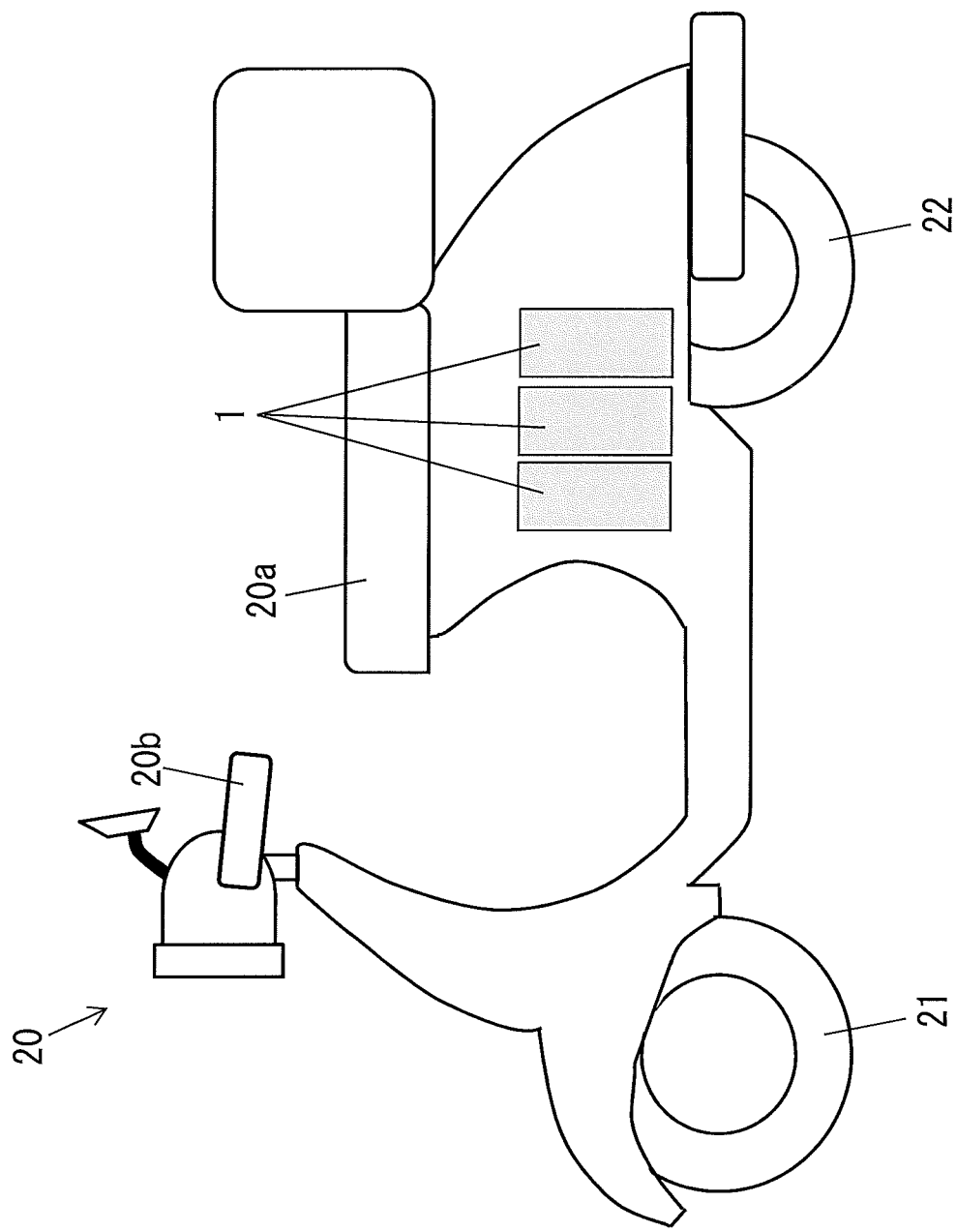
FIG. 1 is a diagram showing the configuration of a vehicle in which are installed battery packs that can be reserved for rental with the battery reservation device pertaining to an embodiment of the present invention.

The battery reservation device 10 pertaining to this embodiment accepts an exchange (rental) reservation for battery packs 1 installed in an exchangeable state in a vehicle 20 such as the electric motorcycle shown in FIG. 1.

In this embodiment, the exchange of the battery packs 1 installed in the vehicle 20 will be described as being synonymous with rental of the battery packs 1.

As shown in FIG. 1, the battery packs 1 are secondary batteries for supplying power to the vehicle 20, and three of them are installed in an exchangeable state in the vehicle 20. The battery packs 1 are repeatedly used by being charged with chargers 31 (see FIG. 2) installed in specific battery stations 30a to 30c.

Figure 2:
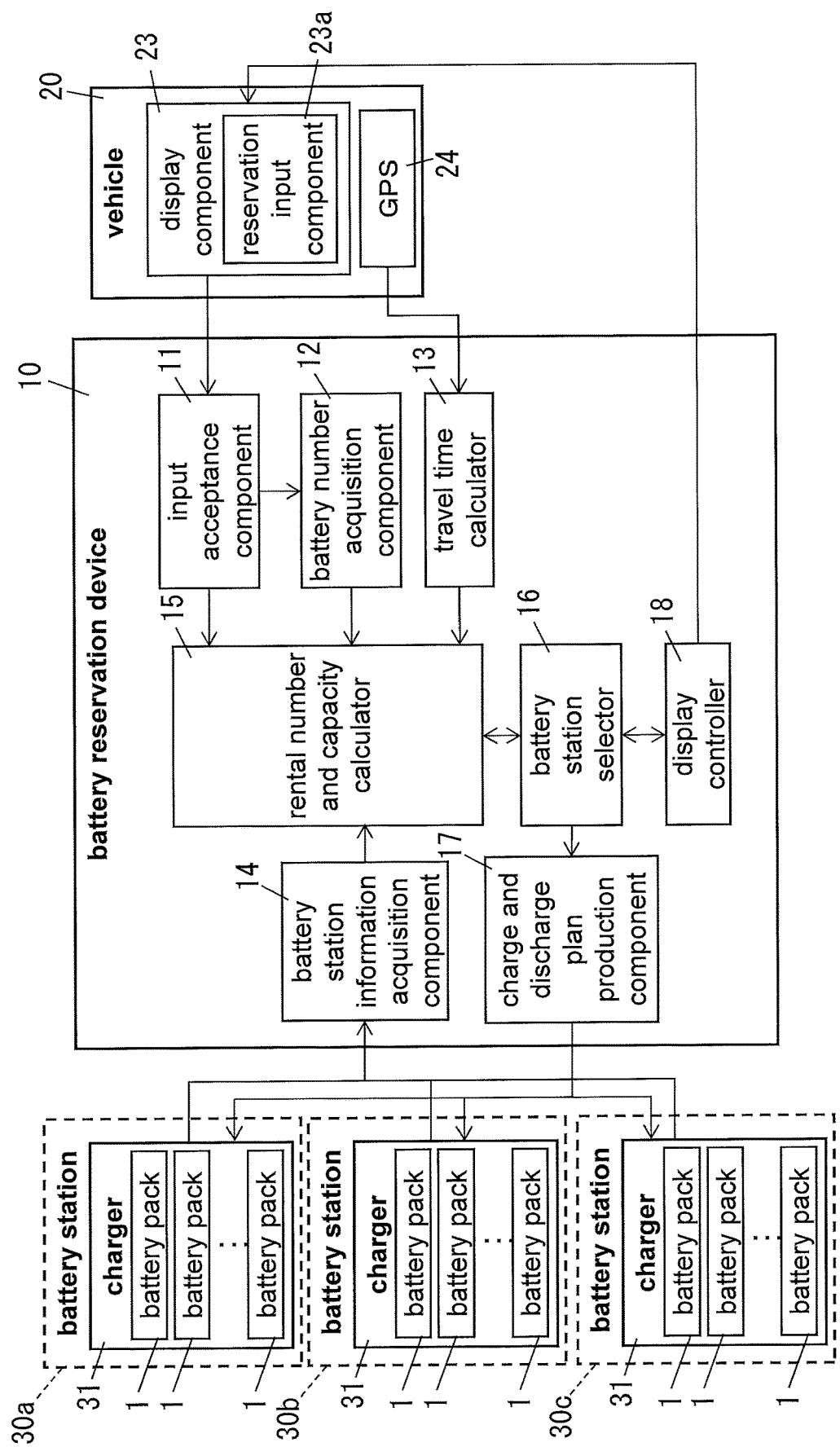
FIG. 2 is a block diagram showing the configuration of the battery reservation device for reserving the rental of a plurality of battery packs installed in the vehicle in FIG. 1.

The vehicle 20 is an electric motorcycle that is propelled when supplied with power from the three battery packs 1 installed under a seat 20 a, and comprises a front wheel 21, a rear wheel (drive wheel) 22, a display component 23 (see FIG. 2), and a GPS (global positioning system) 24 (see FIG. 2).

The front wheel 21 is a steered wheel provided between the front part of the vehicle 20 and the road surface, and the travel direction can be varied by changing the orientation in conjunction with the orientation of a handle bar 20b.

The rear wheel 22 is a drive wheel provided between the road surface and the rear part of the vehicle 20 where the battery packs 1 are installed, and is rotationally driven by a motor (not shown).

The display component 23 is a display device provided near the center portion of the handle bar 20b of the vehicle 20, and displays the remaining battery charge of the three battery packs 1 installed in the vehicle 20, vehicle speed, and so forth. The display component 23 is constituted by a touch panel type of liquid crystal display device, for example.

Also, the display component 23 has a reservation input component 23a to which reservation information for reserving battery exchange is inputted to the battery reservation device 10. The display component 23 then displays a reservation input screen for reserving the battery stations 30a to 30c, such as the reservation input screen discussed below.

When the remaining battery charge of the three battery packs 1 decreases, the user looks at the remaining battery charge at that point and inputs information such as the total power amount required at the time of exchange. The reservation input component 23a then inputs the battery stations 30a to 30c to be reserved by the user via the reservation input screen displayed on the display component 23.

Also, although the number of battery stations 30a to 30c shown in FIG. 2 is three for the purpose of description, the number of battery stations that can be reserved with the battery reservation device 10 in this embodiment is not limited to this. For instance, if the installation density of battery stations varies from one area to the next, all of the battery stations set up within a radius of a few kilometers around the current location of the vehicle 20 may be reserved.

The GPS 24 is installed in the vehicle 20, receives a signal from a GPS satellite, and acquires current location information for the vehicle 20. The GPS 24 then transmits the acquired current location information to a travel time calculator 13 of the battery reservation device 10.

Configuration of Battery Reservation Device 10

The battery reservation device 10 is a device that accepts exchange reservations for battery packs 1 that are charged or being charged and are stored in the plurality of battery stations 30a to 30c, and is installed in each of the battery stations 30a to 30c, for example. As shown in FIG. 2, the battery reservation device 10 comprises an input acceptance component 11, a battery number acquisition component 12, a travel time calculator 13, a battery station information acquisition component 14, a rental number and capacity calculator 15, a battery station selector 16, a charge and discharge plan production component 17, and a display controller 18.

In this embodiment, the battery packs 1 reserved by the battery reservation device 10 include those that have been charged by the time of reservation, and those that are being charged (see the table in FIG. 5).

The input acceptance component 11 accepts reservation information related to the exchange of the battery packs 1 inputted by the user via the display component 23 (reservation input component 23a) of the vehicle 20. More specifically, the input acceptance component 11 accepts information related to the total power amount (2000 wh) desired to be rented that is inputted via the reservation input screen S1 shown in FIG. 3 and the desired pickup time (10:00 to 10:15). The input receiving component 11 then transmits information related to the total power amount and the desired pickup time to the rental number and capacity calculator 15, and transmits ID information about the vehicle 20 to the battery number acquisition component 12.

In the case of the vehicle 20 in FIG. 1, the total power amount inputted to the input acceptance component 11 refers to the combined power of the three battery packs 1 that need to be exchanged at the same time.

The battery number acquisition component 12 uses a unique ID or the like assigned to each vehicle 20 and included in the reservation information accepted by the input acceptance component 11 to acquire the number of battery packs 1 that can be installed in the vehicle 20 (three in the case of the vehicle 20 in FIG. 1). More specifically, the battery number acquisition component 12 acquires the number of battery packs 1 that can be installed by using information about the vehicle 20 corresponding to the ID stored ahead of time in a specific database.

The travel time calculator 13 acquires the current location information for the vehicle 20 acquired from the GPS 24 installed in the vehicle 20. The travel time calculator 13 then calculates the distance from the current location to each of the battery stations 30a to 30c, and calculates the travel time to each of the battery stations 30a to 30c.

The travel time to each of the battery stations 30a to 30c can be calculated using the travel distance and the average speed over the past hour.

The battery station information acquisition component 14 acquires information such as the number of battery packs 1 held in each of the battery stations 30a to 30c and the charging status (battery remaining charge), via a communication line. More specifically, assuming that the number of battery packs 1 held in the battery station 30a is ten, for example, the battery station information acquisition component 14 acquires the ID of each battery pack 1, the remaining battery charge, the reservation status, and the like.

The rental number and capacity calculator 15 calculates the number and capacity of the battery packs 1 that can be rented, by using the total power amount and the desired pickup time accepted by the input acceptance component 11, the number of battery packs 1 that can be installed in the vehicle 20 as acquired by the battery number acquisition component 12, and the information about the battery stations 30a to 30c acquired by the battery station information acquisition component 14. The rental number and capacity calculator 15 also acquires the travel time from the current location of the vehicle 20 to each of the battery stations 30a to 30c calculated by the battery station information acquisition component 14.

More specifically, the rental number and capacity calculator 15 acquires information related to the total power amount and the desired pickup time received from the input acceptance component 11, and acquires information about the battery stations 30a to 30c from the battery station information acquisition component 14.

Consequently, the rental number and capacity calculator 15 determines whether or not a battery pack 1 with the desired total power amount will be available at each of the battery stations 30a to 30c at the desired pickup time inputted by the user, and calculates a combination of the battery packs 1 at the battery stations 30a to 30c where they are available.

For example, when the total power amount inputted by the user is 2000 wh, as shown in FIG. 4, the combination of battery packs 1 can be one with a 2000 wh capacity, two with a 1000 wh capacity, three with a 666.7 wh capacity, and four with a 500 wh capacity.

Here, as shown in FIG. 4, the rental number and capacity calculator 15 sets the priority order to be in the order of the fewest exchanges of battery packs 1. This is because fewer exchanges is preferable in order to allow the user to finish swapping the battery packs 1 in as short a time as possible. Then, the rental number and capacity calculator 15 determines whether or not reservations can be made at the battery stations 30a to 30c from among these combinations.

In the example shown in FIG. 4, since the rated capacity of one battery pack 1 is 1000 wh, it is impossible to obtain a total power amount of 2000 wh with a single battery pack 1, so a replacement number of 1 can not be selected. Therefore, the priority order here is set among the options of two to four exchanges.

With regard to the option of exchanging two 1000-wh battery packs 1 having the highest priority ranking, since two battery packs 1 of the rated capacity are not available at the battery stations 30a to 30c, this reservation is impossible.

Therefore, in this embodiment, the battery stations 30a to 30c capable of exchanging three battery packs 1 having a capacity of 666.7 wh or exchanging four battery packs 1 having a capacity of 500 wh are presented as options with a second-place priority.

The battery station selector 16 presents the battery stations 30a to 30c capable of exchanging a combination of battery packs 1 as calculated by the rental number and capacity calculator 15.

Figure 6:
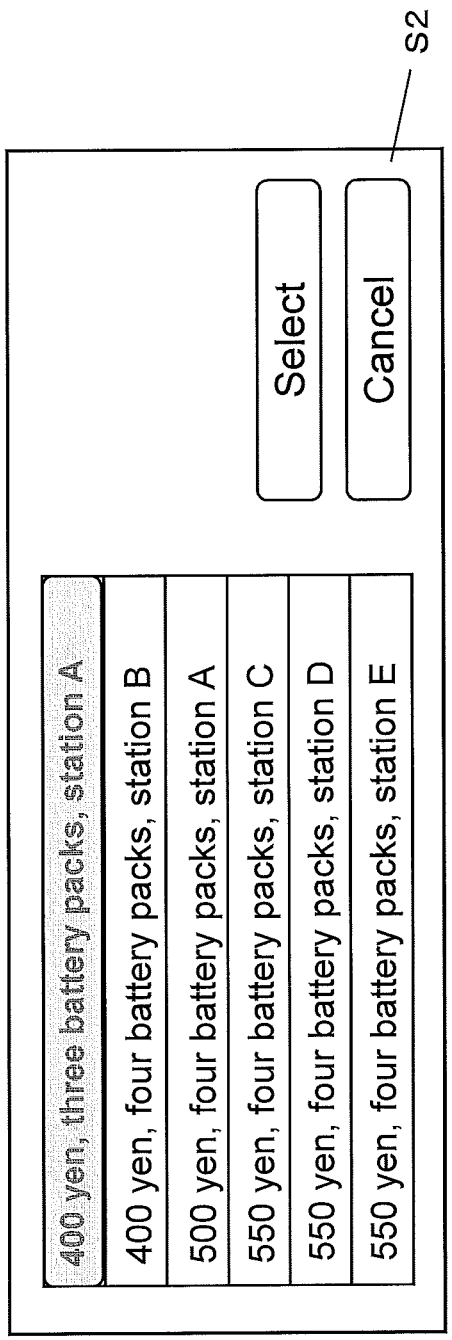
FIG. 6 is a view showing a reservation input screen displayed on the display component of the vehicle shown in FIG. 2, which is used to select a battery station and includes the number of battery packs that can be rented and the rental price.

More specifically, as shown in FIG. 6, the battery station selector 16 presents battery stations (stations A to E) capable of exchanging three or four battery packs 1 as options.

Depending on the total power amount and the desired pickup time inputted by the user, it is conceivable that none the battery stations 30a to 30c will satisfy the reservation conditions. In this case, the battery station selector 16 displays on the screen of the display component 23 that reservation is impossible.

Consequently, the user can search again for battery stations 30a to 30c where a reservation can be made, by changing what is inputted, such as reducing the total power amount or extending the desired pickup time.

The charge and discharge plan production component 17 prepares the battery pack 1 reserved at the selected battery station A (out of the plurality of battery stations A to E listed as options) and produces a charge and discharge plan for accepting other reservations.

More specifically, the charge and discharge plan production component 17 produces a charge and discharge plan for a plurality of battery packs 1 in order to create a state in which a reservation can be accepted for the battery packs 1 that can be ready by the desired pickup time, as well as other reservations, on the basis of the desired pickup time and the remaining battery charge of the battery packs 1 currently at the selected battery station A. For example, if the selected battery station A has the ten battery packs 1 shown in FIG. 5, then the three with the battery IDs of 10004, 10008, and 10012 having a capacity of 666.7 wh are reserved. Therefore, the charge and discharge plan production component 17 takes the acceptance of other reservations into account and produces a charge and discharge plan for other battery packs 1, such as those with battery IDs of 10001, 10005, 10013, and 10016.

In the example shown in FIG. 5, since reservation acceptance for another user scheduled to pick up at 11:00 has already been completed for the battery pack 1 with the battery ID of 10003 (battery remaining charge of 900 wh), reservation is impossible in this state.

Figure 7:
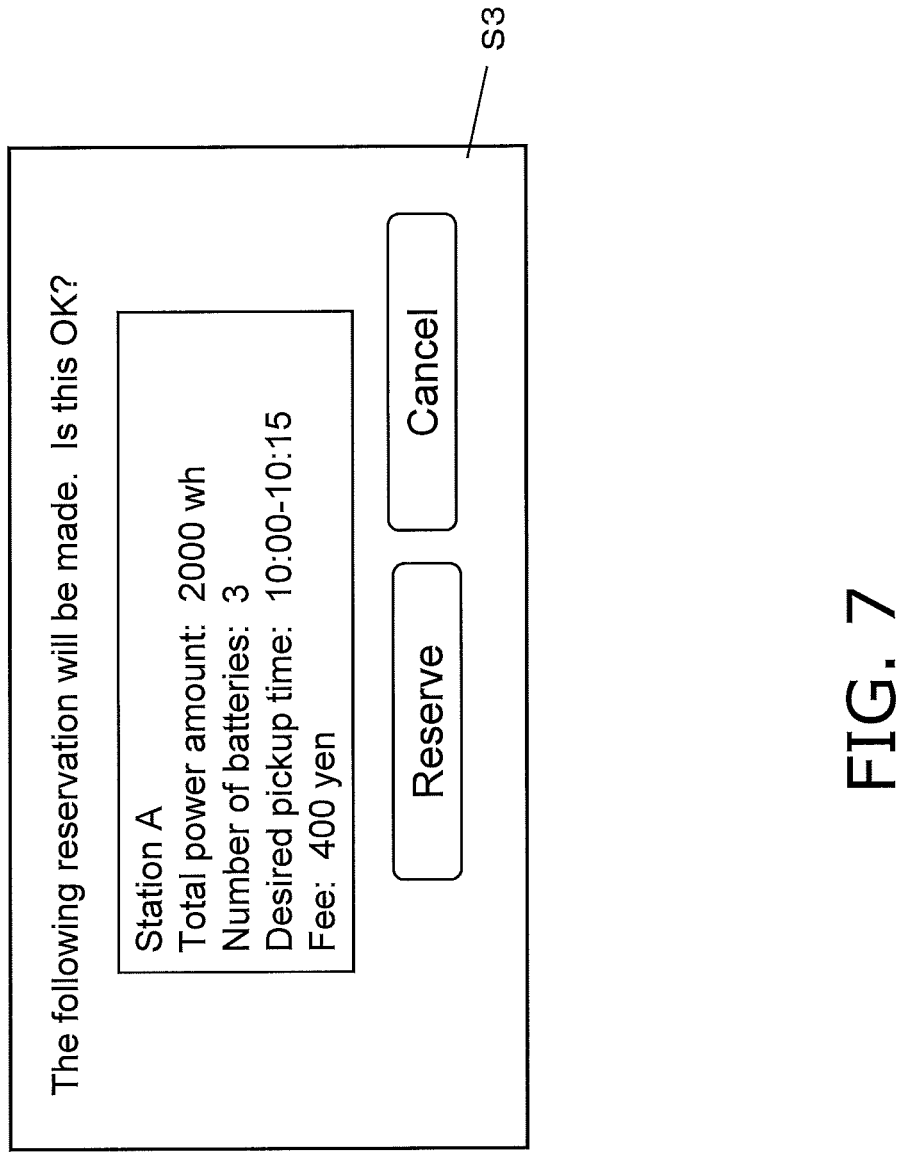
FIG. 7 is a view showing a reservation input screen for confirming a reservation, which is displayed on the display component of the vehicle in FIG. 2.

The display controller 18 causes the plurality of options (battery stations A to E) presented on the battery station selector 16 to be displayed on the reservation input screen S2 of the display component 23 of the vehicle 20 as shown in FIG. 6. Also, when the user selects the battery station A via the reservation input screen S2, the display controller 18 causes the reservation details to be displayed on the reservation input screen S3 of the display component 23, as shown in FIG. 7.

On the reservation input screen S2, six options are displayed for five battery stations A to E. More specifically, one displayed option is for three battery packs 1 to be rented at the battery station A, and five options with a rental number of four at the battery stations A to E are displayed.

In the example shown in FIG. 6, a state is shown in which the option "400 yen, three battery packs, station A" at the top of the six options is selected.

Reservation details for the selected battery station A are displayed on the reservation input screen S3. More specifically, information related to the total power amount reserved (2000 wh), the number (3) of battery packs 1 that satisfies the total power amount, the desired pickup time (10:00 to 10:15), and the rental fee (¥400) is displayed.

Flow up to Reservation Acceptance in Battery Reservation Device 10

Figure 8:
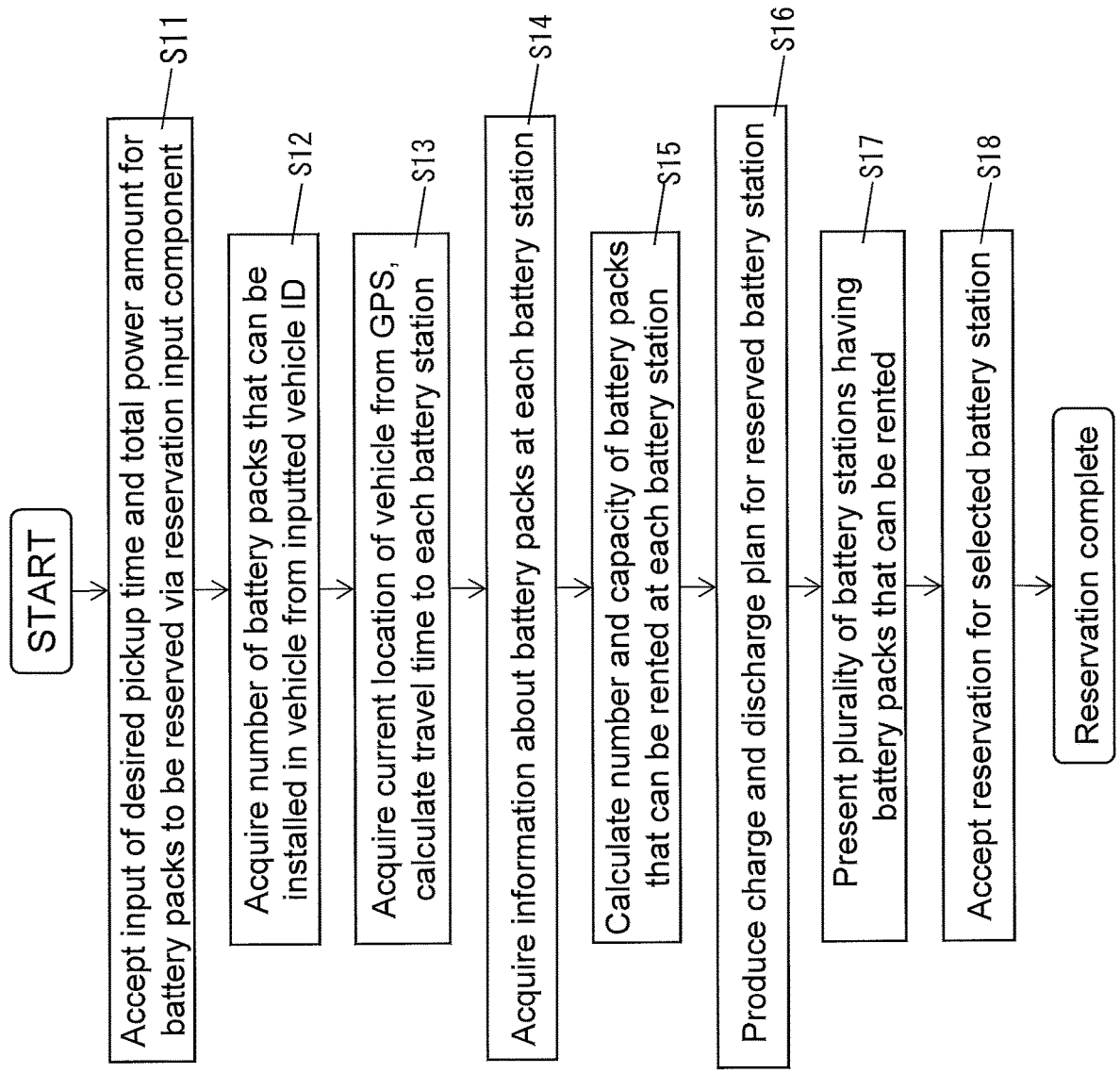
FIG. 8 is a flowchart of the flow in the battery reservation method processed in the battery reservation device of FIG. 2.

With the battery reservation device 10 in this embodiment, the battery stations 30a to 30c that are the best for the user are selected according to the flowchart shown in FIG. 8, and an exchange reservation for the battery packs 1 is accepted.

That is, in step S11, the input acceptance component 11 accepts the information related to the total power amount desired to be rented and the desired pickup time inputted from the reservation input component 23a of the display component 23 of the vehicle 20.

Next, in step S12, the battery number acquisition component 12 uses the inputted ID of the vehicle 20 to acquire the number of battery packs 1 that can be installed in the vehicle 20. In the case of the vehicle 20 shown in FIG. 1, information indicating that three can be installed is acquired.

Next, in step S13, the travel time calculator 13 calculates the travel time to each of the battery stations 30a to 30c from the distance from the current location received from the GPS 24 installed in the vehicle 20 to each of the battery stations 30a to 30c. As described above, the average speed of the vehicle 20 over the past hour or the like is used to calculate the travel time.

Next, in step S14, the battery station information acquisition component 14 acquires information about the battery stations 30a to 30c holding a plurality of battery packs 1. More specifically, information such as the number of battery packs 1 held in each of the battery stations 30a to 30c, the state of charging, whether or not the battery packs are reserved, and so forth is acquired.

Next, in step S15, the rental number and capacity calculator 15 determines whether or not there are battery stations 30a to 30c that satisfy the conditions of the total power amount the user wants to rent and the desired pickup time. If there are battery stations 30a to 30c that satisfy the conditions, the number and capacity of the battery packs 1 that can be readied at the battery stations 30a to 30c are calculated.

Here, if there are no battery stations 30a to 30c that satisfy the conditions of the total power amount and the desired pickup time inputted by the user, as mentioned above, the user sees a display indicating that reservation is impossible. In this case, a reservation input screen prompting the user to change the conditions may be displayed on the display component 23.

Next, in step S16, the charge and discharge plan production component 17 produces a charge plan for reserved battery packs 1 and a charge and discharge plan for the battery packs 1 after reservation at the battery stations 30a to 30c listed as reservation candidates.

Next, in step S17, the battery station selector 16 presents a plurality of battery stations 30a to 30c that have rentable battery packs 1 that satisfy the user's inputted conditions as reservation destination candidates.

The plurality of battery stations A to E presented on the battery station selector 16 are displayed as the reservation input screen S2 on the display component 23 of the vehicle 20 by the display controller 18 as shown in FIG. 6.

Next, in step S18, as shown in FIG. 7, the reservation details for the battery station A selected by the user from among the plurality of battery stations A to E displayed on the display component 23 of the vehicle 20 are displayed as the reservation input screen S3, and reservation acceptance is completed when the user selects the reserve button.

Other Embodiments

An embodiment of the present invention was described above, but the present invention is not limited to or by the above embodiment, and various modifications are possible without departing from the gist of the invention.

(A)

Figure 3:
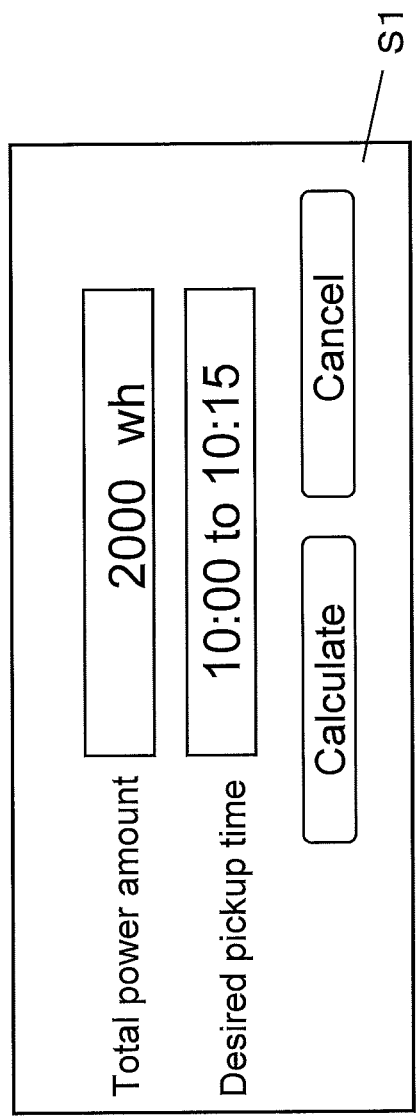
FIG. 3 is a view showing a reservation input screen displayed on a display component of a vehicle when reserving the rental of battery packs with the battery reservation device in FIG. 2.

In the above embodiment, as shown in FIG. 3, an example was given in which the reservation input screen S1 on which the total power amount and the desired pickup time were inputted was used the user as an input screen for making reservation input. However, the present invention is not limited to this.

Figure 9:
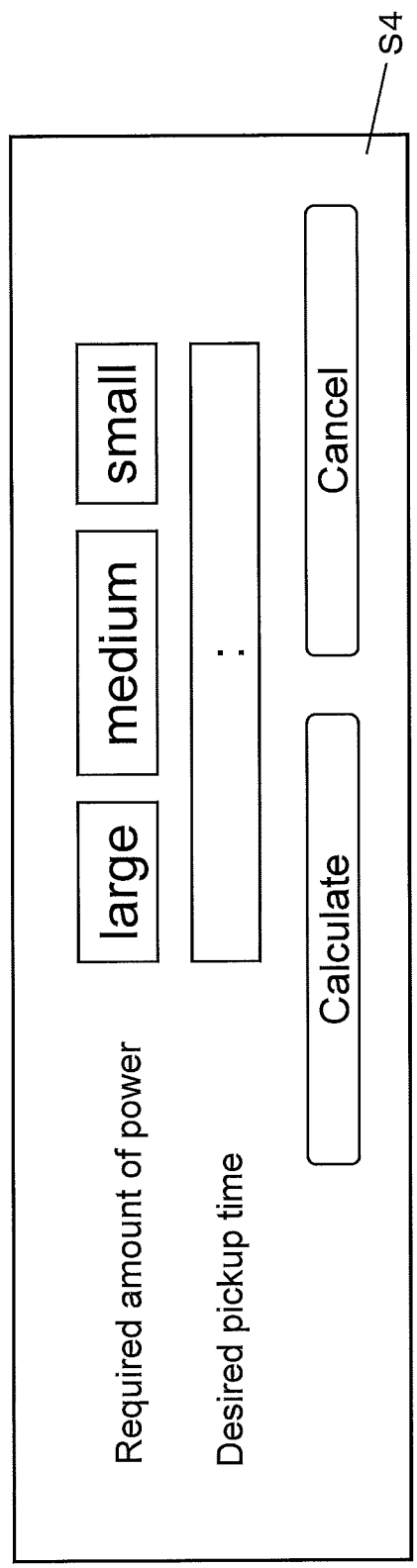
FIG. 9 is a view showing a reservation input screen displayed on the display component of a vehicle when reserving the rental of a battery pack with the battery reservation device pertaining to another embodiment of the present invention.

For example, as shown in FIG. 9, instead of the total power amount, a reservation input screen S4 on which selection is made using a plurality of buttons such as "large," "medium," and "small" indicating in stepwise fashion the amount of power required of the battery packs to be rented may be used as the screen on which a reservation is inputted by the user.

That is, qualitative expressions such as "large," "medium," and "small" may be selected as information related to the total power amount inputted to the input acceptance component 11.

In this case, all the user has to do is intuitively select a plurality of buttons indicating in steps the required amount of power for the battery packs the user wants to rent, so a battery reservation device that is more convenient to use can be provided.

Figure 10:
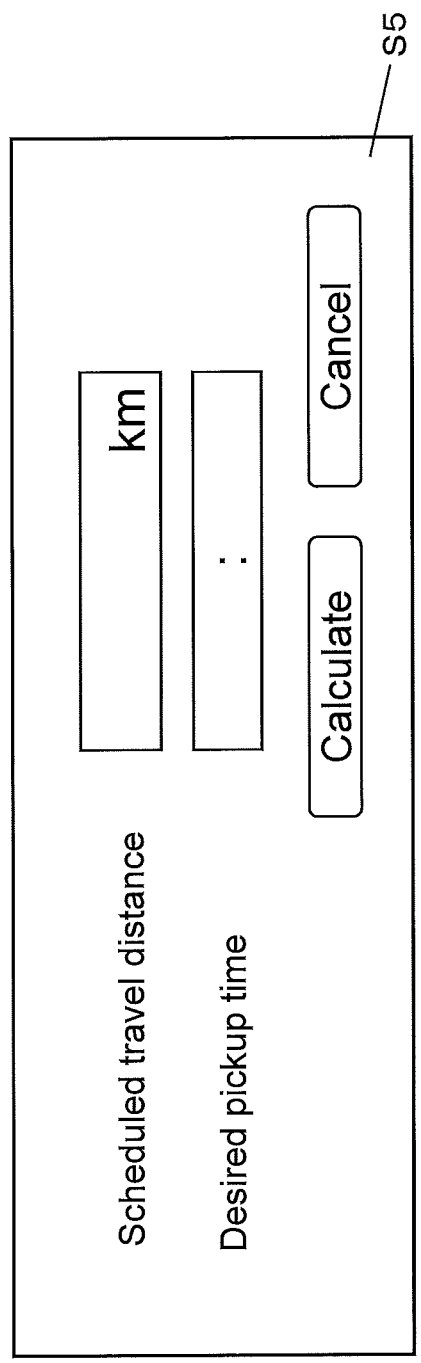
FIG. 10 is a view showing a reservation input screen displayed on the display component of a vehicle when reserving the rental of a battery pack with the battery reservation device pertaining to yet another embodiment of the present invention.

Also, when the power consumption element is vehicle, as shown in FIG. 10, instead of the value of the total power amount, a reservation input screen S5 on which the scheduled travel distance after the exchange of battery packs is inputted may be used as the information related to the total power amount.

In this case, the user simply inputs the distance based on the scheduled travel distance to the destination, etc., the amount of power need to travel that distance is calculated, and the number and capacity of battery packs to be exchanged can be calculated.

In the course of calculating the required amount of power from the inputted distance, it is preferable to calculate the required amount of power by referring to the power consumption during the most recent travel, for example. Alternatively, the power consumption over an average kilometer of travel by the vehicle may be referred to.

(B)

In the above embodiment, as shown in FIG. 3, an example was given in which the reservation input screen S1 on which the total power amount and the desired pickup time were inputted was used as an input screen for performing reservation input from the user. However, the present invention is not limited to this.

For example, the desired pickup time may be omitted from the inputted items.

In this case, the user inputs only information related to the total power amount and selects a battery station at which battery packs can be picked up at the desired pickup time from among the plurality of battery stations displayed on the reservation input screen.

(C)

In the above embodiment, as shown in FIG. 6, an example was given in which battery stations 30*a* to 30*c* which are able to combine three or four battery packs 1 of the same capacity were presented as options that could be reserved on the reservation input screen S2. However, the present invention is not limited to this.

For example, for the plurality of battery packs held at each battery station, battery stations that can combine battery packs of different capacities and offer a combination of battery packs selected so that at least the total power amount inputted by the user can be provided may be listed as options.

(D)

In the above embodiment, an example was given in which the unique ID or the like attached to each vehicle 20 included in the reservation information accepted by the input acceptance component 11 was used to acquire the number of battery packs 1 that could be installed in the vehicle 20 (in the vehicle 20 of FIG. 1, three). However, the present invention is not limited to this.

For example, the number of battery packs that can be installed in a vehicle or other such power consumption element may be acquired not only by using a unique ID attached to the vehicle and stored ahead of time in the database, but also from the vehicle of other power consumption element, along with the reservation information.

(E)

In the above embodiment, as shown in FIG. 6, an example was given of using the reservation input screen S2 on which the battery packs 1 were displayed in the order of lowest rental fee and the fewest exchanges for the plurality of battery stations 30*a* to 30*c* serving as reservation destination candidates. However, the present invention is not limited to this.

For example, the waiting time after arrival at the battery station may be calculated, and the priority order set in the order of the shortest waiting time.

(F)

In the above embodiment, an example was given in which the battery packs 1 were installed in the vehicle 20 under the seat 20*a*. However, the present invention is not limited to this.

For example, the battery packs set may be disposed in the portion of the vehicle 20 under the handle bar 20*b*.

(G)

In the above embodiment, an example was given in which the battery reservation device 10 was installed in the battery stations 30*a* to 30*c*. However, the present invention is not limited to this.

For example, the device may be installed at a location other than a battery station, such as a reservation management center that centrally manages the reservation status of battery packs, so long as communication is possible between the vehicle and the battery station.

(H)

In the above embodiment, an example was given in which the battery reservation device 10 was installed in each of the battery stations 30*a* to 30*c*. However, the present invention is not limited to this.

For instance, a battery reservation device may be installed in each vehicle.

In this case, each vehicle can present the best battery station to the user by acquiring necessary information such as the battery pack charging status at each battery station, via a communication component.

(I)

In the above embodiment, an example was given in which three battery packs 1 were installed in an electric motorcycle (vehicle 20) as a power consumption element. However, the present invention is not limited to this.

For example, two battery packs or four or more battery packs may be installed in the power consumption element.

(J)

In the above embodiment, an example was given in which four or more battery packs 1 were held in a charger 31 at each of the battery stations 30*a* to 30*c*. However, the present invention is not limited to this.

For example, in the case of a large battery station, the number of battery packs held in the charger may be 30 or more.

In this case, since a greater number of combinations of battery packs will satisfy the conditions, it is possible to accept a large number of rental reservations at the battery station.

(K)

In the above embodiment, an example was given of battery packs 1 that supplied power to an electric motorcycle as a power consumption element (vehicle 20). However, the present invention is not limited to this.

For instance, the present invention may be applied not only to battery packs for supplying power to an electric motorcycle, but also to those used in other vehicles such as electric monocycles, electric bicycles, electrically assisted bicycles, electric automobiles (EVs), and PHVs (plug-in hybrid vehicles).

Alternatively, the electric power consumption element to which power is supplied from the battery pack of the present invention is not limited to a vehicle, and may instead be some other electrical product powered by a replaceable battery.

INDUSTRIAL APPLICABILITY

The battery reservation device of the present invention has the effect of simplifying the operation entailed by reserving the rental of battery packs for a power consumption element in which a plurality of battery packs are installed, and is therefore widely applicable as a reservation device that accepts reservations for the rental of battery packs installed in various products.

REFERENCE SIGNS LIST 1 battery pack
10 battery reservation device
11 input acceptance component
12 battery number acquisition component
13 travel time calculator
14 battery station information acquisition component
15 rental number and capacity calculator
16 battery station selector
17 charge and discharge plan production component
18 display controller
20 vehicle
20a seat
20b handle bar
21 front wheel
22 rear wheel
23 display component
23a reservation input component
24 GPS
30a to 30c battery stations
31 charger
S1 to S5 reservation input screens
S11 to S18 steps

The invention claimed is:

1. A battery reservation device that makes reservations at battery stations for rental of a plurality of battery packs installed in a power consumption element, the battery reservation device comprising a processor configured with a program to perform operations comprising:
   operation as an input acceptance component to which reservation information related to a total amount of power desired to be rented is inputted from a user of the power consumption element;
   operation as a battery number acquisition component configured to acquire information related to a number of battery packs that are installed in the power consumption element by using unique information of the power consumption element included in the reservation information inputted to the input acceptance component; and
   operation as a rental number and capacity calculator configured to calculate a number and capacity of rentable battery packs at each battery station based on information related to the number of battery packs acquired by the battery number acquisition component and the total amount of power desired to be rented as inputted to the input acceptance component,
   operation as a charge and discharge plan production component configured to, in response to the rental number and capacity calculator calculating the number and capacity of the rentable battery packs at each battery station, produce a charge and discharge plan for the rentable battery packs based on the number and capacity of the rentable battery packs, in order for reserved battery packs to be ready at a desired pickup time, and
   operation as a display component configured to display the number and capacity of the rentable battery packs calculated by the rental number and capacity calculator to the user.

2. The battery reservation device according to claim 1, wherein the information related to the total amount of power desired to be rented inputted to the input acceptance component comprises one of the following: a rental duration, a payment amount, and an amount of power desired to be rented.

3. The battery reservation device according to claim 2, wherein the processor is configured with the program to perform operations such that operation the input acceptance component comprises operation as the input acceptance component that accepts input information selected by the user from among a plurality of options set in stages.

4. The battery reservation device according to claim 1, wherein information related to the desired pickup time of the battery packs at the battery station is further inputted to the input acceptance component.

5. The battery reservation device according to claim 1, wherein the processor is configured with the program such that operation as the display component comprises operation as the display component configured to present the battery stations from which the battery packs can be rented, based on the number and capacity of the battery packs that are rentable calculated by the rental number and capacity calculator.

6. The battery reservation device according to claim 5, wherein the processor is configured with the program to perform operations such that operation the display component comprises operation as the display component that, in presenting a plurality of options, sets a priority order for the battery stations that are reservation candidates, based on at least one of the following: a distance from a current location to the battery station, a number of rentals, a rental fee, and a waiting time at the battery station.

7. The battery reservation device according to claim 1, wherein the power consumption element comprises a vehicle, including an electric motorcycle, an electric bicycle, an electrically assisted bicycle, an electric automobile, or a PHV (plug-in hybrid vehicle).

8. A battery reservation method for reserving rentals at battery stations for a plurality of battery packs installed in a power consumption element, the battery reservation method comprising:
   an input acceptance step of which a reservation information related to total amount of power desired to be rented is inputted from a user of the power consumption element to an input acceptance component;
   a battery number acquisition step of acquiring information related to a number of battery packs that are installed in the power consumption element by using unique information of the power consumption element included in the reservation information inputted to the input acceptance component;

an input acceptance step of inputting information related to a total amount of power desired to be rented, from a user of the power consumption element; and a rental number and capacity calculation step of calculating a number and capacity of rentable battery packs at each battery station based on information related to the number of battery packs acquired in the battery number acquisition step and the total amount of power desired to be rented inputted in the input acceptance step, a charge and discharge plan production step of, in response to calculating the number and capacity of the rentable battery packs at each battery station, producing a charge and discharge plan for the rentable battery packs based on the number and capacity of the rentable battery packs, in order for reserved battery packs to be ready at a desired pickup time, and a display step of displaying the number and capacity of the rentable battery packs calculated by the rental number and capacity calculator to the user on a display component.

* * * * *